Patented Oct. 26, 1937

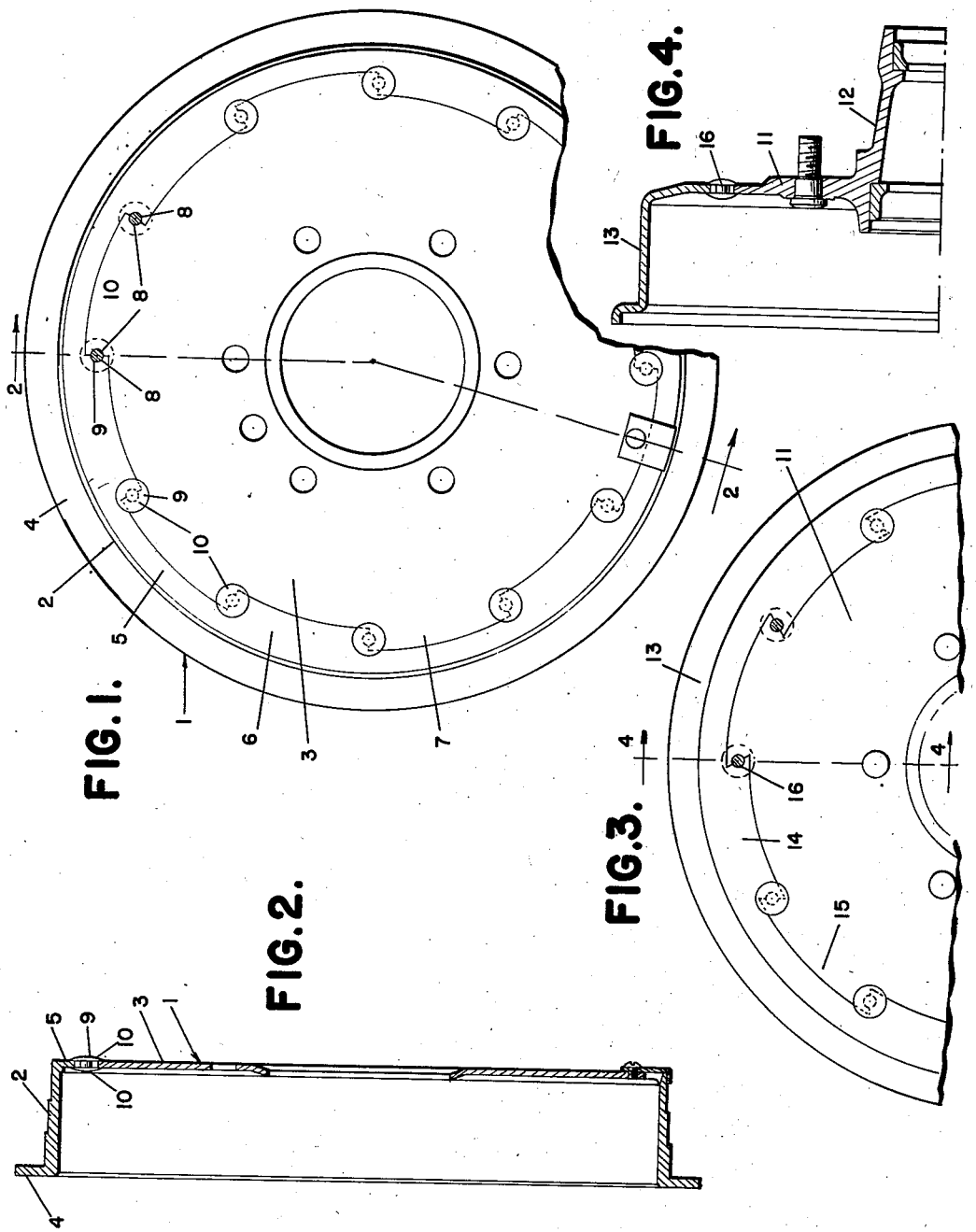

2,097,125

UNITED STATES PATENT OFFICE 2,097,125

BRAKE DRUM

Frank H. Le Jeune, Detroit, Mich., assignor to Kelsey-Hayes Wheel Company, Detroit, Mich., a corporation of Delaware Application September 16, 1935, Serial No. 40,822

10 Claims. (Cl. 188—218)

The invention relates to brake drums and refers more particularly to brake drums formed of a plurality of parts.

The invention has for one of its objects to provide an improved construction of brake drum in which the parts are adapted to be rotated as a unit by means separate from the means for holding the parts in assembled relation, whereby the holding means is relieved from driving stress. The invention has for another object to so construct the brake drum that the holding means is also relieved of stress resulting from any tendency toward relative radial movement of the parts.

These and other objects of the invention will become apparent from the following description, taken in connection with the accompanying drawing, in which Figure 1 is an elevation of a brake drum showing an embodiment of my invention;

Figure 2 is a cross section on the line 2—2 of Figure 1;

Figure 3 is a view similar to Figure 1 showing another embodiment of my invention;

Figure 4 is a cross section on the line 4—4 of Figure 3.

Referring to Figures 1 and 2, I is the brake drum which is designed particularly for use with wheels of motor vehicles and which comprises the annular brake flange 2 and the radial back 3 for supporting the brake flange. The brake flange and the back are formed separately and are preferably formed of different materials. The brake flange, in the present instance, is formed of a high carbon steel to provide a satisfactorily wearing internal brake surface, while the back is formed of a low carbon sheet steel. In this connection, it is apparent that other materials may be readily used also.

The brake flange 2 is formed at its free edge with the radially outwardly extending reinforcing flange 4 and at its opposite edge with the radially inwardly extending flange or part 5, which registers with and is adapted to be connected to the radially outer part of the back 3. The flange or part 5 is formed with the angularly spaced radially inwardly extending projections 6 and the radially outer part of the back 3 is formed with the angularly spaced radially outwardly extending projections 7. The projections 7 fit between and engage the projections 6, the engaging portions of the side faces of these projections extending radially of the brake drum. The side edges of the projections 6 and 7 intermediate their ends are cut away at 8 to form circular openings through which extend the shanks of the rivets 9. These rivets have the heads 10 which overlap and engage the opposite faces of the adjacent projections 6 and 7 and which serve to hold the brake flange from axial movement relative to the back and, more particularly, serve to hold the projections of the brake flange in registration with and operative relation to the projections of the back.

With this construction, it will be seen that the brake flange and the back of the brake drum may be separately formed of the desired materials to secure a brake drum at relatively low cost of manufacture having a satisfactorily wearing brake surface. It will also be seen that the brake flange and back are adapted to be rotated as a unit by the interfitting projections upon the two and that these projections relieve the holding means or the rivets from driving stress, so that the latter function only to hold the brake flange and back in operative relation.

In the modification shown in Figures 3 and 4, the back or support 11 of the brake drum constitutes the fixed flange of the wheel hub 12 and, as shown, is a steel forging. The brake flange 13, as shown, is a steel stamping. The adjacent radial parts of the brake flange and back are formed with the interfitting projections 14 and 15 respectively, which have undercut side edges making the projections dove-tailed in effect. The side edges of these interfitting projections are cut away in the same manner as the side edges of the interfitting projections of Figures 1 and 2 to receive the shanks of the rivets 16 which are formed in the same manner as the rivets of Figures 1 and 2. By reason of the projections being dove-tailed, these projections, in addition to functioning to rotate the brake flange and back as a unit, function to hold the brake flange from radial movement relative to the back. As a result, these projections additionally serve to relieve the rivets from shearing stress resulting from any tendency of the brake flange to move radially relative to the back.

What I claim as my invention is:

1. A brake drum, comprising a brake flange, a back, cooperating radially flared dovetailed means upon said flange and back for rotating the two as a unit, and means engaging said flange and back for holding the same from relative axial movement with respect to each other.

2. A brake drum, comprising a brake flange, a back, said flange and back having interfitting radially flared dovetailed projections for rotating the two as a unit, and means engaging said flange and back and holding said projections in interfitting relation.

3. A brake drum, comprising a brake flange having a radial part, a back having a radial part, cooperating angularly spaced shoulders upon said radial parts for rotating said flange and back as a unit, and angularly spaced members engaging said radial parts therebetween and holding said shoulders in cooperating relation.

4. A brake drum, comprising a brake flange having angularly spaced radial projections, a back having angularly spaced radial projections fitting between and engaging said first mentioned projections, and shouldered members extending between said first and second mentioned projections and having shoulders engaging the opposite faces thereof to hold said projections from relative axial movement.

5. A brake drum, comprising a brake flange having angularly spaced radial projections with undercut side edges, a back having angularly spaced radial projections with undercut side edges extending between said first mentioned projections, the side edges of said last mentioned projections fitting and engaging the side edges of said first mentioned projections, whereby said brake flange is held from circumferential and also radial movement relative to said back, and shouldered members extending between the adjacent side edges of said first and second mentioned projections and having shoulders engaging the opposite faces thereof to hold said projections from relative axial movement.

6. A brake drum, comprising an annular brake flange having a radial part formed with angularly spaced radially inwardly extending dovetailed projections, a back having angularly spaced radially outwardly extending dove-tailed projections interfitting with said first mentioned projections, and rivet members extending between the adjacent edges of said projections and having heads extending over and engaging opposite faces of said projections for holding said projections from relative axial movement.

7. A brake drum, comprising a brake flange, a back, said flange having inwardly extending radial projections, said back having outwardly extending radial peripheral projections interfitting with said first mentioned projections, and means engaging said flange and back at the abutting edges of said first and second mentioned projections and holding the same in cooperating relation.

8. A brake drum comprising a brake flange, a back, said flange having inwardly extending radial projections, said back having outwardly radial peripheral projections interfitting with said first mentioned projections, said first and second mentioned projections having inwardly diverging opposite edges, and means engaging said flange and back for holding the same from relative axial movement with respect to each other.

9. A brake drum comprising a brake flange having angularly spaced radial projections, a back having angularly spaced radial projections fitting between and engaging said first mentioned projections, said projections having shoulders adapted to prevent radial movement of the flange and back, and means engaging said flange and back for holding the same against relative axial movement.

10. A brake drum comprising a brake flange, a back, said flange and back having interfitting projections all aligned in the same plane for rotating the two as a unit, and means engaging both faces of said flange and said back for holding said projections in interfitting relation.

FRANK H. LE JEUNE.